Feb. 27, 1968  C. L. LOVERCHECK  3,370,484
COUPLING FOR CONNECTING TWO OR MORE ENGINES
Filed April 5, 1965  2 Sheets-Sheet 1

INVENTOR.
CHARLES L. LOVERCHECK

Feb. 27, 1968   C. L. LOVERCHECK   3,370,484
COUPLING FOR CONNECTING TWO OR MORE ENGINES
Filed April 5, 1965                                    2 Sheets-Sheet 2
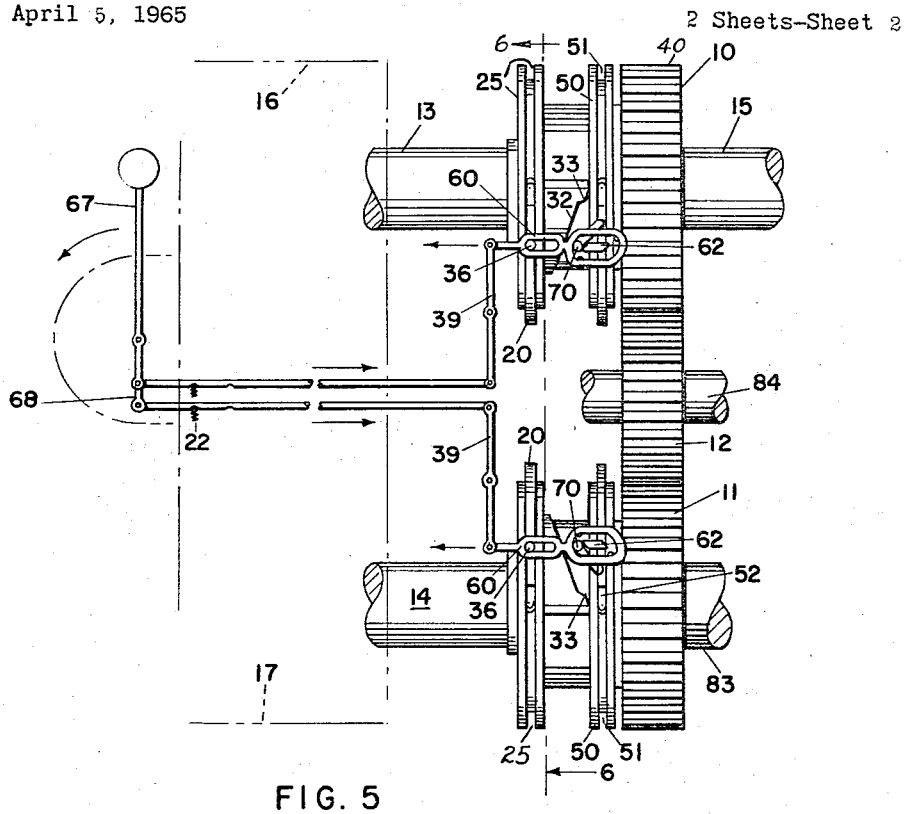
FIG. 5
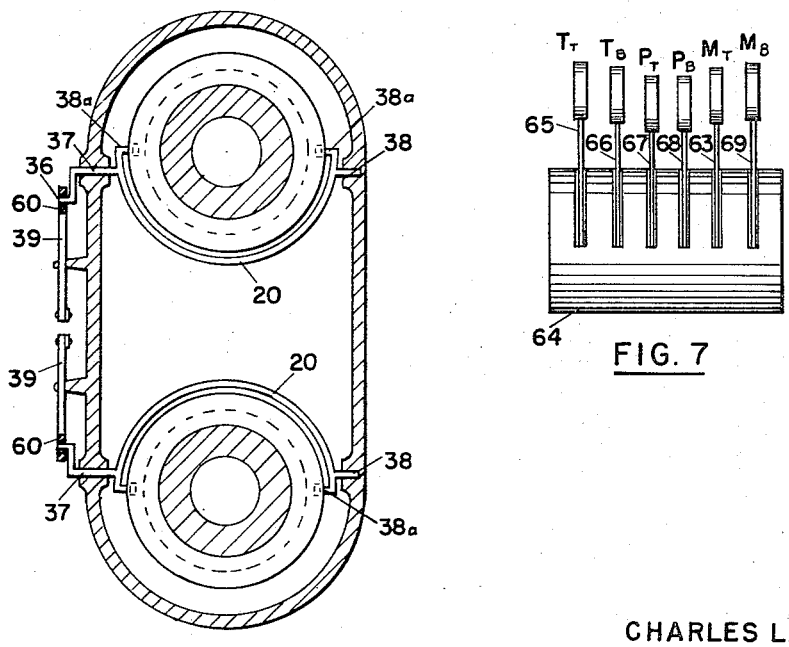
FIG. 6
FIG. 7
INVENTOR.
CHARLES L. LOVERCHECK United States Patent Office 3,370,484
Patented Feb. 27, 1968

3,370,484
COUPLING FOR CONNECTING TWO
OR MORE ENGINES
Charles L. Lovercheck, 632 W. 7th St.,
Erie, Pa. 16502
Filed Apr. 5, 1965, Ser. No. 445,457
11 Claims. (Cl. 74—661)

This invention relates to couplings and, more particularly, to couplings for connecting two or more engines to a single output member.

Where two or more engines are to be connected to a single output shaft, it is desirable to be able to completely disconnect either engine from the output shaft and to selectively connect it thereto. Furthermore, it is desirable for the engines to be coupled to the output in such a way that the power strokes of one engine will be angularly spaced equally from the power strokes of the other engine or engines.

It is further desirable to have a positive drive in a forward direction and a drive that will automatically disconnect itself when a predetermined torque is exerted in a reverse direction by one engine as, for example, where one engine completely "freezes up."

It is further desirable to have a resilient coupling connecting the engines together so that a shock will not result when either engine is connected or coupled to the other.

It is, accordingly, an object of the present invention to provide an improved coupling for connecting two or more engines together.

Another object of the invention is to provide a coupling for two engines wherein the power strokes of one engine may be equally spaced between the power strokes of another engine.

Still another object of the invention is to provide an improved synchronizing device for a coupling.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIG. 5 is a side view of two couplings according to the invention connected together;

FIG. 6 is a cross sectional view taken on line 6—6 of FIG. 5; and

FIG. 7 shows a control console for the device.

Figure 1:
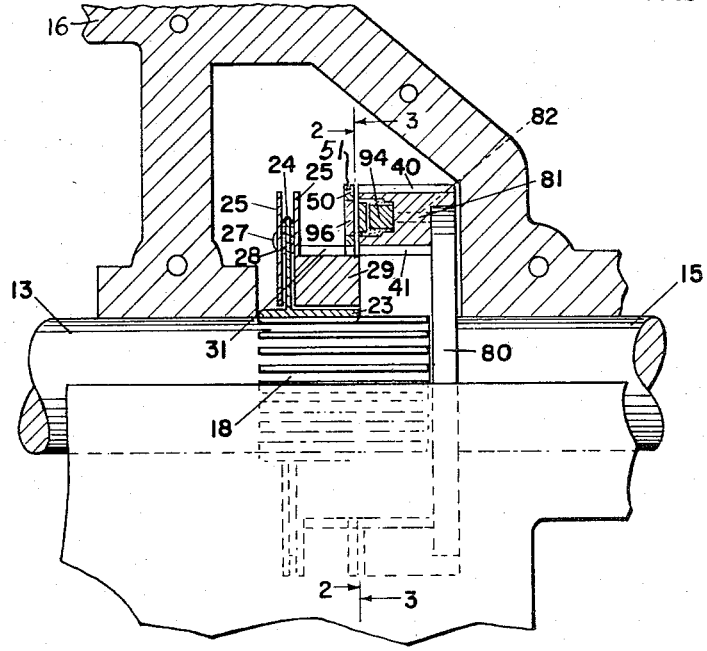
FIG. 1 is a longitudinal view partly in cross section showing one of the couplings.
Figure 2:
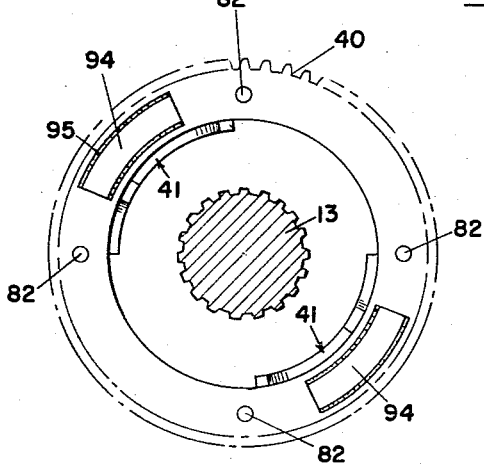
FIG. 2 is a cross sectional view taken on line 2—2 of FIG. 1.
Figure 3:
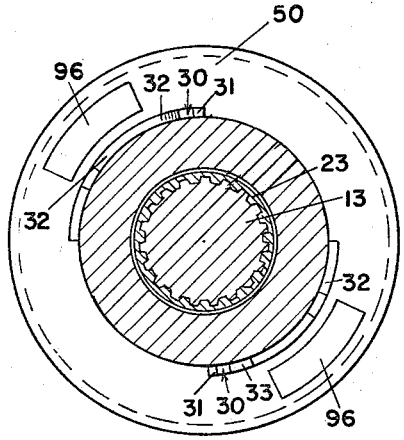
FIG. 3 is a cross sectional view taken on line 3—3 of FIG. 1.
Figure 4:
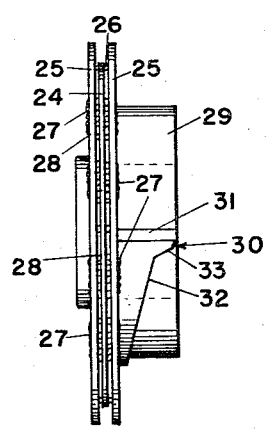
FIG. 4 is a side view of the coupling member.

Now with more particular reference to the drawings and with specific reference to FIGS. 1 and 5, a top engine 16 and a bottom engine 17 are shown by way of example having crankshafts 13 and 14, respectively, which may be selectively connected to the output shaft 15 by means of control levers 67 and 68. The output shaft 15 may be connected to a load; for example, to a single propeller. Obviously shaft 84 or shaft 83 could also be used as the output shaft if desired.

The shaft 15 is fixed to the top output gear 10 by means of a flange 80 which is fixed to the shaft 15 at its center and fixed to the output gear by means of bolts 81 which are disposed in holes 82. The top output gear 10 has external teeth as shown which engage the external teeth on the intermediate gear which, in turn, has external teeth which engage the external teeth on the bottom output gear 11. Thus, the output gears 10 and 11 both rotate in the same direction and have external teeth 40. The output shaft 15 is supported in suitable bearings in the top engine 16 and the shaft 83 on the gear 11 will be supported in a suitable bearing as will the shaft 84 on the intermediate gear 12.

The top engine 16 has the top crankshaft 13 and the bottom engine 17 has the bottom crankshaft 14. The front end of crankshaft 13 is splined externally at 18 as shown and this splined connection is received in the internally splined sleeve 23. The lower crankshaft 14 has a splined end similar to end 18 which is received in a similar internally sleeve-like sleeve 23.

The coupling portion 29 has external lugs 30 spaced one hundred and eighty degrees apart which engage internal lugs 41 on the output gears when the lugs are engaged with each other. The coupling portion 29 is connected to the splined sleeve 23 through a resilient connection made up of flanges 24 which are fixed to the sleeve 23 and has spaced slots therein which receive springs 27. The springs 27 are likewise received in slots 28 in the flanges 25. The flanges 25 are connected together by means of rivets 26 through enlarged hole in a manner that clutch plates in conventional automobiles are connected, which is familiar to those skilled in the art.

Front flange 25 is fixed to the coupling portion 29. Thus, it will be seen that there is a resilient torsional connection between the couplings and the shafts 13 and 14.

The shifting arrangement is generally similar to that used on the conventional automobile. That is, the splined ends of the crankshafts are connected to the coupling means through the resilient connection just described and a coupling means can be shifted so that coupling portion 29 will enter the output gears 10 and 11 and rigidly connect the crankshafts 13 and 14 thereto. This can be accomplished by means of the shifting levers $P_T$ and $P_B$ which act through the linkages 67 and 68 to first move one of the synchronizing clutch plates 50 into engagement with the rear face of one of the gears 10 and 11 and then to shift the coupling portion 29 into positive locked relation with gear 10 or gear 11.

The splined end 18 on the crankshaft is slidably received in the splined sleeve 23 and the sleeve may be slid forward and backward by actuating levers $P_T$ and $P_B$ to connect the crankshafts 13 and 14. The lost motion slot in link 60 receives the end of crank 36 so that when the levers $P_T$ or $P_B$ are moved, the splined sleeve and coupling portion 29 of the particular engine will not move but the crank pin 70 of crank 36 slides up over the inclined portion of cam 62 and swings the crank pin 70 around its journal and forces the clutch plate 50 into engagement with the synchronizing surface 42 on the end of the drive gear 10 or 11. As the levers $P_T$ or $P_B$ are further moved, the crank pin 70 rides up on the flat part of the cam 62 and holds the clutch firmly against the gear. By this time, the crank pin 70 has reached the end of the flat part of the cam 62 and the crank end 36 has reached the front end of the slot in link 60. It is then moved forward, swinging the crank end 36 around its bearing and thereby forcing the coupling portion 29 forward to bring the lugs 30 thereon into engagement with the internal lugs 41 on the drive gears 10 and 11. When the coupling portion 29 is completely inside the drive gear in operative position, the crank pin 70 will be past the flat part of cam 62 and crank pin 70 can move down and the clutch will be released. Therefore, should the bottom engine having crank shaft 14 lock, it will be driving the drive gear through the trailing edge 32 of the lug 30 thereon.

It will be noted that the leading edge 31 of lug 30 extends axially and engages the leading edge of the lug 41 with a flat shoulder thereby positively driving it. The lugs 30 will be disposed in the space between the lugs 41. The trailing edge 32 will engage a like inclined trailing edge on the lug 41 and the shoulder 33 will engage a like inverse torque shoulder portion of similar inclination on the lug 41. The inclined shoulder 33 is disposed at an angle of approximately fifteen degrees. It has been discovered that this is slightly greater than an angle that would be self-locking. Therefore, by exerting a slight force on the sleeve in an axial direction by means of a spring 22 against the detent shown to hold it in engagement, the engines can be cranked by a single starter by rotating gears 10, 11, or 12 in a direction opposite the direction of normal operation, but if an engine becomes locked, the sleeve will be moved out of engagement. If either engine freezes, its counter torque will exert a force which will overcome the resistance of the detent in its notch urged by spring 22 and the inclined portion 32 and the shoulder 33 will be forced away from lug 41, forcing the coupling portion 29 out of the drive gear, and thereby uncoupling the frozen engine.

It will be noted that for engines with four power strokes per revolution, there should be two lugs. An engine with three power strokes per revolution would need to have the lugs spaced one hundred and twenty degrees apart and an engine with four power strokes per revolution would need to have the lugs on the couplings spaced ninety degrees apart to space the power strokes uniformly.

It will be noted that the coupling portion 29 has a smooth inside bore that is free to rotate on the outside surface of the splined sleeve 23 when the springs 27 are deflected, as when a shock is exerted on the coupling.

In order to approximately align the lugs 30 with the spaces between lugs 41, spaced magnets 94 are inset in the top output gear and bottom output gear. These magnets 94 are set in epoxy resin cement 95, thereby providing a space around them, and a lug 41 made of magnetic material overlies the magnet with a space between the armature. The clutch plates 50 are made of stainless steel with inserts of steel at 96. Thus, the magnets 94 will attract the inserts 96 when they pass and thereby exert a greater engaging force between the clutch plate and the gear at this part of the revolution where the inserts overlie the magnets, thereby synchronizing the lugs on the connecting portion 29 with the internal lugs on the output gears.

A propeller or other driven member can be attached to shaft 15. Flange 80 can be attached to gear 10.

Levers $T_T$, $T_B$, $P_T$, $P_B$, $M_T$, and $M_B$ are control levers of a control console 64 similar to that found in conventional twin engine airplanes. These levers are connected to their various functions by linkage 63, 65, 66, 67, 68, and 69, respectively. Lever $P_T$ is connected through its linkage 67 and rocker 39 to link 60. Lever $P_B$ is connected through linkage 68 and its rocker 39 to its link 60.

Rockers 39 are journaled in the engine case at 37 and at 38. The journals are connected together by intermediate member 20. Crank end 36 connects the rocker members to links 60. The eccentric portions 38a are received in grooves 35. A similar eccentric portion 52 or crank pin 70 is received in groove 51 which is formed in clutch plate 50.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a first engine and a second engine, and means to couple said engines to a common output shaft,
    said first engine having a first crankshaft,
    said second engine having a second crankshaft,
    said crankshafts each terminating in an end portion generally parallel to the other,
    first output means connected to said output shaft,
    second output means connected to said first output means,
    first coupling means on said first crankshaft to connect said first crankshaft to said first output means,
    and second connecting means on said second coupling means to connect said second crankshaft to said second output means,
    said first engine having means to deliver power strokes to said first crankshaft at timed intervals,
    said second engine having means thereon to deliver power strokes to said second crankshaft at second timed intervals,
    said connecting means being adapted to connect said coupling means to said output shafts in such a way that each said first timed interval occurs midway between two said second timed intervals and said couplings being adapted to selectively disconnect said crankshafts from said output shaft.

2. The combination recited in claim 1 wherein
    means is connected to said first coupling means and said second coupling means to completely disconnect each said coupling means from each said output gear when a torque greater than a predetermined value is exerted on said coupling in a direction opposite the normal direction of rotation of said engine.

3. The combination recited in claim 1 wherein
    said connecting means comprises an engaging member on each said crankshaft adapted to engage an engaging member on a said output means,
    said engaging members being spaced apart at angles of three hundred sixty degrees divided by the number of power strokes per revolution of each said engine.

4. The combination recited in claim 3 wherein
    a synchronizing means is provided for said engaging member,
    said synchronizing means comprising spaced permanent magnets on said output means spaced an amount equal to said spacing of said engaging member,
    and clutch plates adjacent said output means connected to said crankshafts,
    said clutch plates being made of non-magnetic material with spaced armatures made of magnetic material on said clutch plates.

5. In combination, a first engine and a second engine, and means to couple said engines to a common output shaft,
    said first engine having a first crankshaft,
    said second engine having a second crankshaft,
    said crankshafts each terminating in an end portion generally parallel to the other,
    first output means connected to said output shaft,
    second output means connected to said first output means,
    first coupling means on said first crankshaft,
    second coupling means on said second crankshaft,
    first connecting means on said first coupling means to connect said first coupling means to said first output means,
    second connecting means on said second coupling means to connect said second coupling means to said second output means,
    synchronizing means comprising a first clutch member connected to said first crankshaft and a second clutch member connected to said second crankshaft,
    clutch plate means connected to said output means,
    permanent magnet means on said first clutch member disposed at a position on said first clutch member and extending therearound approximately thirty degrees,
    magnetic means on said clutch plate means disposed around said clutch plate means approximately thirty degrees and having means to cooperate with said permanent magnet means to exert an engaging force on said clutch members when said clutch members have rotated relative to each other to align said permanent magnet means with said magnetic means and thereby align said coupling means and said connecting means.

6. A coupling comprising
a first shaft and a second shaft,
a first member connected to said first shaft and having spaced lugs thereon spaced apart an amount equal to three hundred sixty degrees divided by the number of power strokes per revolution to be exerted by an engine to be connected to one of said shafts,
and a second member connected to said second shaft and having spaced lugs thereon adapted to engage said first mentioned lugs,
said first lugs having a generally flat surface on one side thereof engaging a generally flat surface on said second lugs,
said second lugs having an inclined surface on the side thereof remote from said first lugs,
said inclined surface being slightly less than required to be self locking and spring means tending to hold said lugs together,
said first member being adapted to move said first lugs from said second lugs when a torque of a predetermined value is exerted between said first shaft and said second shaft.

7. The coupling recited in claim 6 wherein
a part of said inclined surface has a first inclined part inclined at a substantially greater angle than the remainder thereof,
said first part being inclined at a slightly greater angle than a self-locking angle.

8. A clutch for connecting a drive member to a driven member wherein the drive member has a second drive member connected thereto, said drive members comprising
internal combustion engines each having a plurality of power strokes per revolution,
means on said clutch for connecting said engines together with the power strokes of one said engine equally spaced in angular position from the power strokes of the other said engine.

9. A clutch for connecting the crankshaft of a first internal combustion engine to the crankshaft of a second internal combustion engine,
said engines each being adapted to deliver a plurality of power strokes at predetermined times during each revolution,
said clutch having means therein for connecting said first engine to said second engine selectively with the power strokes of said first engine half way between the power strokes of said second engine.

10. A clutch arrangement comprising
a first gear and a second gear means connected together in driving relation,
a first and a second engine,
first shifting means to connect said first engine to a driven means.
and second shifting means to connect said second engine to said driven means,
said shifting means comprising a sleeve having two first lugs thereon adapted to engage two second lugs on a mating clutch member whereby said engines will be positively connected in either of two selected positions each being one hundred eighty degrees from the other.

11. A clutch for connecting two engines together comprising
a driven member,
first and second gear means connected to said driven member,
said first gear means having a bore therein,
spaced lugs in said bore,
each of said engines having a crankshaft,
a shifting sleeve slidably engaging said crankshaft,
and spaced lugs on said shifting sleeve,
said lugs on said sleeve being adapted to slide into meshing engagement with said lugs on said first gear,
said lugs on said sleeve being spaced at angular positions one hundred eighty degrees from each other.

References Cited

UNITED STATES PATENTS 2,380,889 7/1945 Waseige _____ 74—661
2,860,713 11/1958 Peterson _____ 74—661

FOREIGN PATENTS 539,454 4/1957 Canada.

MARTIN P. SCHWADRON, *Primary Examiner.*

DAVID J. WILLIAMOWSKY, FRED C. MATTERN, *Examiners.*

C. J. HUSAR, *Assistant Examiner.*